United States Patent [19]

(12) United States Patent (10) Patent No.: US 12,174,805 B2
Algranati et al. (45) Date of Patent: Dec. 24, 2024

(54) SYSTEMS AND METHODS FOR DEDUPLICATING VIEWERSHIP DATA

(71) Applicant: Comscore, Inc., Reston, VA (US)

(72) Inventors: David Algranati, Rahway, NJ (US); Christopher Goughnour, Gladstone, OR (US)

(73) Assignee: Comscore, Inc., Reston, VA (US)

( * ) Notice: Subject to any disclaimer, the term of this patent is extended or adjusted under 35 U.S.C. 154(b) by 146 days.

(21) Appl. No.: 16/782,830

(22) Filed: Feb. 5, 2020

(65) Prior Publication Data

US 2021/0240681 A1 Aug. 5, 2021

(51) Int. Cl.
G06F 18/21 (2023.01)
G06F 16/215 (2019.01)
G06Q 30/0201 (2023.01)
H04N 21/24 (2011.01)

(52) U.S. Cl.
CPC ....... *G06F 16/215* (2019.01); *G06Q 30/0201* (2013.01); *H04N 21/2407* (2013.01)

(58) Field of Classification Search
CPC ... G06F 16/215; G06F 11/34; G06Q 30/0201; H04N 21/2407; H04N 21/25866; H04N 21/44222; H04N 21/6582; H04H 60/31; H04H 60/66; H04H 20/14; H04H 60/29; H04H 60/54; H04H 60/33; H04H 20/38; H04L 41/5077
See application file for complete search history.

(56) References Cited

U.S. PATENT DOCUMENTS

| | | | | | |
|---|---|---|---|---|---|
| 5,499,360 | A | * | 3/1996 | Barbara | G06F 16/334 707/999.005 |
| 9,514,248 | B1 | * | 12/2016 | Guan | H04L 9/40 |
| 10,149,001 | B1 | * | 12/2018 | Sengupta | H04N 21/4227 |
| 10,503,716 | B2 | * | 12/2019 | Chase | G06F 16/2255 |
| 10,613,785 | B1 | * | 4/2020 | Beskales | H03M 7/6023 |
| 2010/0036643 | A1 | * | 2/2010 | Marvasti | H04L 67/535 702/189 |
| 2016/0103916 | A1 | * | 4/2016 | Even-Zohar | G06F 16/9535 707/738 |
| 2016/0249098 | A1 | * | 8/2016 | Pecjak | H04N 21/44224 |
| 2020/0058037 | A1 | * | 2/2020 | Funkhouser | G06Q 30/0201 |
| 2020/0081914 | A1 | * | 3/2020 | Scott | G06F 18/2115 |
| 2020/0320039 | A1 | * | 10/2020 | Manningham | G06F 16/1748 |

(Continued)

*Primary Examiner* — Kris E Mackes
*Assistant Examiner* — Cecile H Vo
(74) *Attorney, Agent, or Firm* — Blank Rome LLP

(57) ABSTRACT

A system identifies redundancies among a plethora of viewership data of each of several markets. Some embodiments may obtain, from each of a plurality of different devices, a different set of viewership data, each set comprising different subsets that respectively relate to different entities; each of the subsets may indicate several time-based views of content over a period of time. These or other embodiments may determine a set of values by performing a set of deterministic functions using the time-based views of each of the subsets; compare the values, which relate to same entities and to same time intervals, of the determined sets of each distinct pair of the devices, and identify, from among the device pairs, candidate pairs. One exemplary output of this approach may be identifiers of the devices of a first pair of devices that is identified from among the candidate pairs.

17 Claims, 4 Drawing Sheets

(56) References Cited

U.S. PATENT DOCUMENTS

| | | | |
|---|---|---|---|
| 2021/0099757 A1* | 4/2021 | Whitely | H04N 21/4532 |
| 2021/0224237 A1* | 7/2021 | Faruquie | G06N 5/01 |
| 2021/0224258 A1* | 7/2021 | Faruquie | G06F 16/244 |
| 2021/0227287 A1* | 7/2021 | Mowrer | H04N 21/4331 |

* cited by examiner

Smart TV

| network_callsign | day_qh | viewtime_minutes | line-score |
|---|---|---|---|
| FBNHD | 7/30/2018 9:00 | 2.433333 | 2.433333 |
| STZENHD | 7/30/2018 9:00 | 1.316667 | 1.316667 |
| FNCHD | 7/30/2018 10:30 | 14.75 | 14.75 |
| FNCHD | 7/30/2018 10:45 | 14.98333 | 14.98333 |
| NIKHD | 7/30/2018 11:15 | 2.766667 | 2.766667 |
| NIKHD | 7/30/2018 11:30 | 14.25 | 14.25 |
| NIKHD | 7/30/2018 11:45 | 14.98333 | 14.98333 |

Sum of Line-scores: 65.48333
Total Time: 65.48333
TV-to-STB Score: 1

STB

| Network_name | day_qh | Viewtime_minutes | Line-score |
|---|---|---|---|
| FOX Business Network | 7/30/2018 9:00 | 2.58336 | 2.433333 |
| Starz Encore | 7/30/2018 9:00 | 1.75002 | 1.316667 |
| FOX News Channel | 7/30/2018 10:15 | 0.53334 | -0.53334 |
| FOX News Channel | 7/30/2018 10:30 | 15 | 14.75 |
| FOX News Channel | 7/30/2018 10:45 | 15 | 14.98333 |
| FOX News Channel | 7/30/2018 11:00 | 15 | 0 |
| FOX News Channel | 7/30/2018 11:15 | 11.76666 | 0 |
| Nickelodeon/Nick-at-Nite | 7/30/2018 11:15 | 2.98332 | 2.766667 |
| Nickelodeon/Nick-at-Nite | 7/30/2018 11:30 | 15 | 14.25 |
| Nickelodeon/Nick-at-Nite | 7/30/2018 11:45 | 15 | 14.98333 |

Sum of Line-scores: 64.94999333
Total Time: 94.6167
STB-to-TV Score: 0.686453801

Overall Score for (TV, STB) relationship for this example: .843227

FIG. 2

$$\sum_{n \in \text{FirstHalf}} a_n TV_n + b_n STB_n$$

$$= \sum_{n \in \text{FirstHalf}} \left( a_n \frac{\sum_{i \in I_{n,1}} \min(t_i, s_i) + \sum_{i \in I_{n,2}} 0 - \sum_{i \in I_{n,3}} t_i}{a_s} + b_n \frac{\sum_{i \in I_{n,1}} \min(t_i, s_i) + \sum_{i \in I_{n,2}} 0 - \sum_{i \in I_{n,3}} s_i}{b_s} \right)$$

$$= \sum_{n \in \text{FirstHalf}} \left( \sum_{i \in I_{n,1}} \min(t_i, s_i) + \sum_{i \in I_{n,2}} 0 - \sum_{i \in I_{n,3}} t_i + \sum_{i \in I_{n,1}} \min(t_i, s_i) + \sum_{i \in I_{n,2}} 0 - \sum_{i \in I_{n,3}} s_i \right)$$

$$= \sum_{n \in \text{FirstHalf}} \left( \sum_{i \in I_{n,1}} \min(t_i, s_i) + t_i + \sum_{i \in I_{n,3}} t_i - \sum_{i \in I_{n,3}} t_i + \sum_{i \in I_{n,1}} \min(t_i, s_i) + s_i - \sum_{i \in I_{n,3}} s_i \right)$$

$$= \sum_{n \in \text{FirstHalf}} \left( \sum_{i \in I_{n,1}} \min(t_i, s_i) + t_i - \sum_{i \in I_{n,3}} t_i + \sum_{i \in I_{n,1}} \min(t_i, s_i) + s_i - \sum_{i \in I_{n,3}} s_i \right)$$

$$\leq \sum_{n \in \text{FirstHalf}} \left( \sum_{i \in I_{n,1}} 2\min(t_i, s_i) + t_i + s_i - \sum_{i \in I_{n,3}} t_{i,s_i} \right)$$

FIG. 4

SYSTEMS AND METHODS FOR DEDUPLICATING VIEWERSHIP DATA

TECHNICAL FIELD

The present disclosure relates generally to systems and methods for obtaining viewership data from different types of devices of a market and for optimally identifying redundant sets of information.

BACKGROUND

Many stakeholders, for example, advertisers, television networks, and content providers, desire accurate viewership information so that they may tailor their content and future programming. Such data may arise from a plurality of sources and may take many different forms. Additionally, the data may be managed by a variety of different services, operators, and technology providers, who may each manage the data in a different manner. Data may come from television set-top boxes (STBs), or equivalent hardware built into a television or other viewing device, and may include data from every channel change, digital video recorder (DVR) event, or user interaction. Supporting data collection across all of these different entities and subsequent reporting is challenging. Problems also exist from other forms of content viewing because automatic content recognition (ACR) may only work well, when the data provider (e.g., the smart television (TV)) knows about the content in advance, to build a schedule.

ACR is an identification technology to recognize content played on a media device or present in a media file. Through algorithms, such as fingerprinting, information from the actual perceptual content is taken and compared to a database of reference fingerprints, each reference fingerprint corresponding to a known recorded work. If the fingerprint of the media clip is matched, the content is deemed recognized. Due to not all content having embedded signatures that ACR may identify, not all of the viewing on smart TVs may be properly tracked; hence, viewership data directly from a user device is typically noisy, which is unacceptable by stakeholders needing reliable content viewing reporting.

A user device (e.g., smart TV) and a receiver (e.g., STB) may indicate an entity from which content is sourced and may indicate view times. Neither, though, can necessarily know for sure the view times because the way people employ their devices and receivers is not perfect. For example, a user may actually leave on indefinitely one of these devices, while the other is still tuned to a network entity. As such, reported viewership data may indicate that the user has been watching something for a period of time (e.g., 15 or more minutes), after they have actually turned off the device facilitating that viewing. Viewership datasets reported from these devices may thus be noisy. For example, from empirical studies, around 37% to 55% of users never turn off their household devices, for a 24-hour period. This data may show that there is a high likelihood that the users are not watching any programs at least for some period of time, even though the device is kept on and its record shows that a certain program is accessed.

There are over 5 million smart TVs and over 70 million STBs in the US. Some of these TVs have to be associated with these STBs, but such associations are unknown or not known with sufficient certainty. There is thus need to join data of devices, in view of the mentioned problem of one of these devices being off or tuned to a different entity notwithstanding viewership data being still tracked. By using both data from a smart TV and from an STB, wherein the data may be different in part and the same in other parts, the parts that are the same may problematically result in duplicate data. Accordingly, there exists a need for systems and methods, when coordinating data collection and formatting from disparate content distribution sources, to handle duplicate data so as to prevent double-counting views.

SUMMARY

Systems and methods are disclosed for identifying and discarding redundancies, from among much viewership data of each content distribution market. Accordingly, one or more aspects of the present disclosure relate to a method for obtaining, from each of a plurality of different devices, a different set of viewership data, each set comprising different subsets that respectively relate to different entities; each of the subsets may indicate several time-based views of content over a period of time. The method may further include: determining a set of values by performing a set of deterministic functions using the time-based views of each of the subsets; comparing the values, which relate to same entities and to same time intervals, of the determined sets of each distinct pair of the devices; and identifying, from among the device pairs, candidate pairs. One exemplary output of this approach may be identifiers of the devices of a first pair of devices that is identified, from among the candidate pairs.

The method is implemented by a system comprising one or more hardware processors configured by machine-readable instructions and/or other components. The system comprises the one or more processors and other components or media, e.g., upon which machine-readable instructions may be executed. Implementations of any of the described techniques and architectures may include a method or process, an apparatus, a device, a machine, a system, or instructions stored on computer-readable storage device(s).

BRIEF DESCRIPTION OF THE DRAWINGS

The details of particular implementations are set forth in the accompanying drawings and description below. Like reference numerals may refer to like elements throughout the specification. Other features may be apparent from the following description, including the drawings and claims. The drawings, though, are for the purposes of illustration and description only and are not intended as a definition of the limits of the disclosure.

FIG. 2 illustrates exemplary viewership data of two different types of devices, in accordance with one or more embodiments.

FIG. 4 illustrates simplifications and computational reductions to derive a preliminary score or upper bound, in accordance with one or more embodiments.

DETAILED DESCRIPTION

Figure 1:
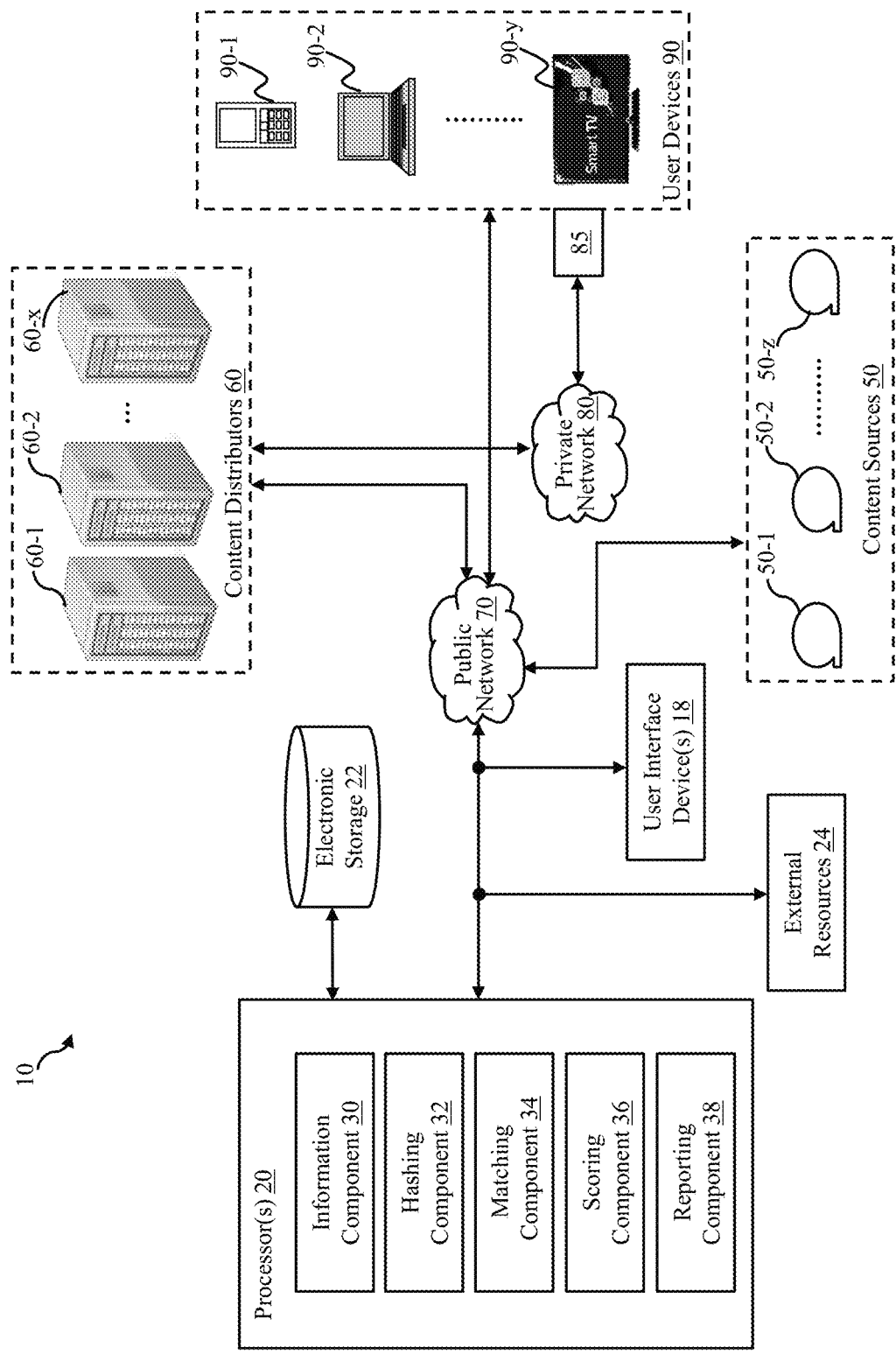
FIG. 1 illustrates an example of a system in which a multitude of data from multiple sources is collected and analyzed, for discarding duplicate information, in accordance with one or more embodiments.

As used throughout this application, the word "may" is used in a permissive sense (i.e., meaning having the potential to), rather than the mandatory sense (i.e., meaning must). The words "include," "including," and "includes" and the like mean including, but not limited to. As used herein, the singular form of "a," "an," and "the" include plural references unless the context clearly dictates otherwise. As employed herein, the term "number" shall mean one or an integer greater than one (i.e., a plurality).

As used herein, the statement that two or more parts or components are "coupled" shall mean that the parts are joined or operate together either directly or indirectly, i.e., through one or more intermediate parts or components, so long as a link occurs. As used herein, "directly coupled" means that two elements are directly in contact with each other.

Unless specifically stated otherwise, as apparent from the discussion, it is appreciated that throughout this specification discussions utilizing terms such as "processing," "computing," "calculating," "determining," or the like refer to actions or processes of a specific apparatus, such as a special purpose computer or a similar special purpose electronic processing/computing device.

Presently disclosed are ways of determining a similarity score, which allows effective determination as to whether two sets of noisy or incomplete viewing data are from the same device or a pair of devices that are connected to each other (e.g., a Smart TV connected to an STB). More particularly, FIG. 1 exemplarily illustrates system 10 configured to determine similarity hashing and perform preliminary scoring (e.g., to avoid scoring every pair of potential matches), which makes it possible to find those matches within very large collections of viewing data in practical amounts of time and to avoid the use of more expensive server hardware.

System 10 may be configured to obtain high-resolution viewership data (e.g., intra-day, intra-hour, etc.) with respect to a plurality of different views of content by a plurality of different users/devices of a plurality of different pieces of the content of a plurality of different channels/stations, each being distributed by one or more distributors.

In some embodiments, processor(s) 20 of system 10 may apply processing to tunes (i.e., viewership data) before any matching because it is not necessarily the case that the length of the tune corresponds to how long a user was actually watching an entity (i.e., network, station, channel, etc.) because user device 90 or receiver 85 may be turned off. In some embodiments, processor(s) 20 may improve data reliability by better determining whether a user turns off the household device, when he or she is not actually viewing the content displayed on the displaying device. For example, processor(s) 20 may process prolonged viewing (e.g., where the user is watching the same thing in one or more consecutive time intervals) because it could be that the user just left on their receiver.

In some embodiments, user devices 90 (e.g., 90-1, 90-2, . . . 90-y) may each be directly coupled to receiver 85. For example, one or more receivers 85 may be paired with each user device 90. In other examples, one or more user devices 90 may be paired with each receiver 85. As such, content viewed at user device 90 may be provided from another source than from a network connection (e.g., the Internet), in some embodiments. That is, receiver 85 may provide content for viewing on the same display screen of user device 90. But user device 90 being connected to receiver 85 does not necessarily indicate that what is being viewed by the user is being provided by receiver 85.

Each user device 90 may view and report tune data, from within a household or another unit of residence (or other viewing location, such as a business location) in which there are one or more other, reporting devices (e.g., STBs 85), which may be in communication with the user device. The tunes may reflect users' viewership behavior, e.g., by comprising data records, which identify specific user interactions. These interactions, with a television or other viewing device, may include channel changes, DVR usage, or other suitable interactions involving content viewing. In some embodiments, these data records or tuning data may include the following: one or more unique identifiers of receiver 85 and/or of user device 90; one or more view times (e.g., one date/time-stamp for the start or resumption of the tune and one date/time-stamp for each end, duration of access, and/or other timing information descriptive of a content view); and one or more content identifiers (such as a channel number, network name, or entity identifier from which the content is directly or indirectly accessed). The time-date stamp may be stored in a number of different formats, such as the number of seconds elapsed since a reference time. One may recognize that receiver 85 may refer to an STB physically located outside a display device, software and/or firmware within a device, or a hardware module within the device, etc. As used herein, receiver 85 and user device 90 may each represent any device reporting tune data.

In this disclosure, station and channel may be used synonymously, market and distribution network may be used synonymously, and telecast and a piece of content may be used synonymously. The terms receiver and STB may also be used synonymously to indicate any device configured to support wireless content transmissions. User device 90 may obtain, using receiver 85, content over the air (OTA) (e.g., advanced television systems committee (ATSC) 1.0 broadcast or ATSC 3.0 multicast) and/or via private, proprietary network 80, such as cable TV or on-demand video (e.g., operated by Dish, DirectTV, Cox, Charter Spectrum, AT&T, Comcast, Verizon, or another distributor 60). In some embodiments, a piece of content may refer to a telecast, series, over-the-top (OTT) program, or a recurrent program. Each telecast or piece of streamed content may be a local or national program, such as a local morning news, an episode of a popular TV show, or a national basketball association (NBA) playoff game. The content may be aired via a certain station or channel, with a specific start-time and run-time.

As used herein, "channel" may refer to any identifier of a particular source of video content, for example: a network name (e.g., ABC or CBS), a broadcast organization's call sign (e.g., KOMO-TV), an analog or digital broadcast or demodulation frequency (e.g., 615.25 MHz), a "real" channel (which may correspond to an actual transmission frequency (e.g., 38), a "virtual" channel (not representing an actual frequency, e.g., SiFy channel), a main channel by itself (e.g., 4), a sub channel number by itself (e.g., 0.1), a main channel combined with a sub channel (e.g., 4.1), a digital networking address such as an internet protocol (IP) address, a uniform resource locator (URL), a video sharing website channel (such as a YouTube user's content channel), a content identifier (e.g., Superbowl 2019, Seinfeld season 3, episode 2, or the name of a pay-per-view program), or any other content identifier utilized for cable television, broadcast television, satellite television, Internet viewing, and/or other content viewing.

Electronic storage 22 of FIG. 1 comprises electronic storage media that electronically stores information. The electronic storage media of electronic storage 22 may comprise system storage that is provided integrally (i.e., substantially non-removable) with system 10 and/or removable storage that is removably connectable to system 10 via, for example, a port (e.g., a USB port, a firewire port, etc.) or a drive (e.g., a disk drive, etc.). Electronic storage 22 may be (in whole or in part) a separate component within system 10, or electronic storage 22 may be provided (in whole or in part) integrally with one or more other components of system 10 (e.g., a user interface device 18, processor 20, etc.). In some embodiments, electronic storage 22 may be located in a server together with processor 20, in a server that is part of external resources 24, in user interface devices 18, and/or in other locations. Electronic storage 22 may comprise one or more of optically readable storage media (e.g., optical disks, etc.), magnetically readable storage media (e.g., magnetic tape, magnetic hard drive, floppy drive, etc.), electrical charge-based storage media (e.g., EPROM, RAM, etc.), solid-state storage media (e.g., flash drive, etc.), and/or other electronically readable storage media. Electronic storage 22 may store software algorithms, information obtained and/or determined by processor 20, information received via user interface devices 18 and/or other external computing systems, information received from external resources 24, and/or other information that enables system 10 to function as described herein.

External resources 24 may include sources of information (e.g., databases, websites, etc.), external entities participating with system 10, one or more servers outside of system 10, a network (e.g., the Internet), electronic storage, equipment related to Wi-Fi technology, equipment related to Bluetooth® technology, data entry devices, and/or other resources. In some implementations, some or all of the functionality attributed herein to external resources 24 may be provided by resources included in system 10. External resources 24 may be configured to communicate with processor 20, user interface device 18, electronic storage 22, and/or other components of system 10 via wired and/or wireless connections, via a network (e.g., a local area network and/or the Internet), via cellular technology, via Wi-Fi technology, and/or via other resources.

User interface device(s) 18 of system 10 may be configured to provide an interface between one or more users and system 10. User interface devices 18 are configured to provide information to and/or receive information from the one or more users. User interface devices 18 include a user interface and/or other components. The user interface may be and/or include a graphical user interface configured to present views and/or fields configured to receive entry and/or selection with respect to particular functionality of system 10, and/or provide and/or receive other information. In some embodiments, the user interface of user interface devices 18 may include a plurality of separate interfaces associated with processors 20 and/or other components of system 10. Examples of interface devices suitable for inclusion in user interface device 18 include a touch screen, a keypad, touch sensitive and/or physical buttons, switches, a keyboard, knobs, levers, a display, speakers, a microphone, an indicator light, an audible alarm, a printer, and/or other interface devices. The present disclosure also contemplates that user interface devices 18 include a removable storage interface. In this example, information may be loaded into user interface devices 18 from removable storage (e.g., a smart card, a flash drive, a removable disk) that enables users to customize the implementation of user interface devices 18.

In some embodiments, user interface devices 18 are configured to provide a user interface, processing capabilities, databases, and/or electronic storage to system 10. As such, user interface devices 18 may include processors 20, electronic storage 22, external resources 24, and/or other components of system 10. In some embodiments, user interface devices 18 are connected to a network (e.g., the Internet). In some embodiments, user interface devices 18 do not include processor 20, electronic storage 22, external resources 24, and/or other components of system 10, but instead communicate with these components via dedicated lines, a bus, a switch, network, or other communication means. The communication may be wireless or wired. In some embodiments, user interface device 18 is a laptop, desktop computer, smartphone, TV, tablet computer, and/or another user interface device.

Data and content may be exchanged between the various components of the system 10 through a communication interface and communication paths using any one of a number of communications protocols corresponding to the different media delivery platforms. In one example, data may be exchanged employing a protocol used for communicating data across a packet-switched internetwork using, for example, the Internet Protocol Suite, also referred to as TCP/IP. The data and content may be delivered using datagrams (or packets) from the source host to the destination host solely based on their addresses. For this purpose the Internet Protocol (IP) defines addressing methods and structures for datagram encapsulation. Of course other protocols also may be used. Examples of an Internet protocol include Internet Protocol Version 4 (IPv4) and Internet Protocol Version 6 (IPv6). In another example, data may be exchanged employing a protocol used for communicating data across satellites and/or coaxial cables.

In some embodiments, processor(s) 20 may form part (e.g., in a same or separate housing) of a user device, a consumer electronics device, a mobile phone, a smartphone, a personal data assistant, a digital tablet/pad computer, a wearable device (e.g., watch), augmented reality (AR) googles, virtual reality (VR) googles, a reflective display, a personal computer, a laptop computer, a notebook computer, a work station, a server, a high performance computer (HPC), a vehicle (e.g., embedded computer, such as in a dashboard or in front of a seated occupant of a car or plane), a game or entertainment system, a set-top-box, a monitor, a smart TV, a panel, a space craft, or any other device. In some embodiments, processor 20 is configured to provide information processing capabilities in system 10. Processor 20 may comprise one or more of a digital processor, an analog processor, a digital circuit designed to process information, an analog circuit designed to process information, a state machine, and/or other mechanisms for electronically processing information. Although processor 20 is shown in FIG. 1 as a single entity, this is for illustrative purposes only. In some embodiments, processor 20 may comprise a plurality of processing units. These processing units may be physically located within the same device (e.g., a server), or processor 20 may represent processing functionality of a plurality of devices operating in coordination (e.g., one or more servers, user interface devices 18, devices that are part of external resources 24, electronic storage 22, and/or other devices).

As shown in FIG. 1, processor 20 is configured via machine-readable instructions to execute one or more computer program components. The computer program components may comprise one or more of information component 30 (e.g., for data retrieval and pre-processing), hashing (deterministic) component 32, matching component 34, scoring component 36, reporting component 38, and/or other components. Processor 20 may be configured to execute components 30, 32, 34, 36, and/or 38 by: software; hardware; firmware; some combination of software, hardware, and/or firmware; and/or other mechanisms for configuring processing capabilities on processor 20.

It should be appreciated that although components 30, 32, 34, 36, and 38 are illustrated in FIG. 1 as being co-located within a single processing unit, in embodiments in which processor 20 comprises multiple processing units, one or more of components 30, 32, 34, 36, and/or 38 may be located remotely from the other components. For example, in some embodiments, each of processor components 30, 32, 34, 36, and 38 may comprise a separate and distinct set of processors. The description of the functionality provided by the different components 30, 32, 34, 36, and/or 38 described below is for illustrative purposes, and is not intended to be limiting, as any of components 30, 32, 34, 36, and/or 38 may provide more or less functionality than is described. For example, one or more of components 30, 32, 34, 36, and/or 38 may be eliminated, and some or all of its functionality may be provided by other components 30, 32, 34, 36, and/or 38. As another example, processor 20 may be configured to execute one or more additional components that may perform some or all of the functionality attributed below to one of components 30, 32, 34, 36, and/or 38.

User devices 90, depicted in FIG. 1, may consume content provided by content distributors 60 and/or content sources 50. User devices 90 may be of different types, such as TVs and projectors, that consume content via public network 70 and/or private network 80. Receivers 85 may include any device configured to receive content from content distributors 60 and transmit the content to one or more display components of user devices 90. User devices 90 may therefore view content from content sources 50 via content distributors 60 using receivers 85 provided and managed by content distributors 60. For example, receivers 85 may include external cable television converters configured to receive content via a coaxial cable and transmit the content to a TV. User devices 90 may also be connected to similar content or video-on-demand (VOD) content via DVR 85, digital media receiver (DMR) 85, internal tuner 85 (e.g., for ATSC 1.0 or 3.0 broadcast), or satellite receiver 85. Content distributors 60 may thus include satellite television operators, local or regional broadcasters, and/or any other distributors of content through network 80 and/or network 70.

In some embodiments, user device 90 may obtain content, for subsequent display, from the Internet. For example, user devices 90 may be connected to network 70 to send requests for content, receive the content in response, and provide tuning data to processors 20 (e.g., directly or via content distributors 60). In these or other embodiments, user device 90 may further obtain content using receiver 85. In some embodiments, receivers 85 may be configured to generate tuning data indicative of content they access. Receivers 85 may be configured to save the tuning data, for example, in an internal data storage (which may subsequently be accessed via network 70) and/or transmit the tuning data to content distributors 60 (via network 80 or network 70). The tuning data may be indicative of content (e.g., movies, television shows, music, or other media) accessed by receivers 85 through content distributors 60. The tuning data may also be indicative of content accessed by offline user(s), such as content accessed from an internal storage device of receiver 85.

Content distributors 60 may be configured to receive (e.g., irregularly, periodically, or on request) the tuning data from content sources 50, from third-party aggregators of tuning data (not shown), directly from receivers 85 via network 80, and/or directly from user devices 90 via network 70. Processors 20 may obtain access to the tuning data and save it as viewership data within electronic storage 22. By analyzing the tuning data, processors 20 may be configured to determine viewing habits, such as the duration that the content is accessed, a particular source that is accessing the content, and/or a type of content. The tuning data may also provide such information as channel changes, recording or replaying of content, and changes in playback of content. In some embodiments, networks 70 and/or 80 may facilitate content viewership over a plurality of different channels that respectively pertain to a plurality of different content sources.

Content distributors 60 may be configured to access names and/or other identifying information of members (e.g., users) of the households associated with user devices 90. Accordingly, content distributors 60 may be configured to correlate receivers 85 to users of the associated household. The tuning data may also be associated with a unique identifier, so that the tuning data is attributable to the respective receiver 85 or user device 90. The unique identifier may be an identifier of the customer premises equipment (e.g., the MAC address of STB 85 or of user device 90), an identifier of a user associated with user device 90 or with receiver 85 (e.g., a cable television customer account number, phone number, etc.), a globally unique identifier ("GUID"), the address of the physical location of the display component, and/or similar identifying elements.

Some embodiments may gather STB tuning information from many (e.g., tens of millions) households subscribed to distributors or to TV service providers, which report at least some of such information. These distributors and TV providers may operate in one or more of several dozen (e.g., hundreds) markets. Some embodiments may then project the reporting data out to measure viewership, with respect to TV stations and cable networks, across substantially all households of a region or country. In these or other embodiments, tuning data may be reported, collected, and projected with respect to OTT content providers.

In some embodiments, information component 30 is configured to remotely receive viewership or tuning data, including a number of minutes or seconds a network entity was viewed. In some embodiments, user device 90 (e.g., a Smart TV) may report the measured viewership, e.g., when users opt-in to viewership measurement. This viewership may be measured, for a given period of time, via any suitable means, such as via a panel application, via other known ways to generate tune data, and/or via known ways of performing automatic content recognition (ACR). In some embodiments, viewership data is restricted to networks that occur in both sources of each candidate pair of devices.

Some embodiments of information component 30 may support hundreds or even thousands (e.g., 1,730) of stations or channels. That is, some embodiments may obtain viewership data of content from some or all of these channels over the past several months. The obtained data may include telecast information from each of the distributors, a variable for identifying the distributor, a variable for indicating a holiday, a variable for the current day of the week when the content is viewed or aired, a variable for the hour of viewing (e.g., to distinguish between AM and PM viewing), and/or a variable for the month of the year.

In some embodiments, user devices 90 and/or receiver 85 may report viewership data immediately upon detection of viewing beginning or ending (e.g., within 90 seconds), periodically (e.g., every 4 hours, once per week, etc.), or on-demand (e.g., by a stakeholder). In some implementations, the reported data may not indicate a source device of the viewership.

In some embodiments, the reported data from each of user devices 90 and/or receiver 85 may be a sequence of (i)

network viewed, (ii) intervals, and (iii) time spent in the viewing (e.g., of live content). In some embodiments, a duration of each interval may be user-adjustable, e.g., via UI devices 18 to quarter-hour intervals or to any other granular time interval. In some embodiments, information component 30 may discard viewership events that are less than a certain (e.g., 60 seconds) time duration.

Variable $I_n$, exemplarily used herein, may be a set of intervals in which user device 90 is detected to facilitate viewing of content from an identified entity. In some embodiments, at least some of the herein-referred-to entities may be content distributors 60 (e.g., 60-1, 60-2, . . . 60-x) and/or content sources 50 (e.g., 50-1, 50-2, . . . 50-z).

Variable $I_{n,1}$, exemplarily used herein, may be a set of intervals in which both user device 90 and receiver 85 are detected to facilitate viewing of content from an identified entity. Variable $I_{n,2}$, exemplarily used herein, may be another set of intervals in which user device 90 is detected to have facilitated consecutive content viewing (e.g., for at least a whole interval) from an identified entity and in which receiver 85 is detected to not have facilitated content viewing (e.g., from any entity). Variable $I_{n,3}$, exemplarily used herein, may be another set of intervals in which: (i) user device 90 is detected to have facilitated consecutive content viewing from an identified entity, (ii) receiver 85 is detected to not have facilitated content viewing from this entity, and (iii) either the viewing facilitated by user device 90 is not consecutive or the content facilitated by receiver 85 is viewed from another entity. As such, $I_{n,3}$ may be considered to encompass much if not all patterns of user device 90's viewing other than $I_{n,1}$ and $I_{n,2}$.

Variable $I_{n,4}$, exemplarily used herein, may be a set of intervals in which user device 90 is detected to have facilitated consecutive viewing of content from an identified entity. Variable $I_{n,5}$, exemplarily used herein, may be a set of intervals in which user device 90 is detected to have facilitated consecutive viewing of content from an identified entity and in which receiver 85 is detected to have facilitated content viewing.

Variable $J_n$, exemplarily used herein, may be a set of intervals in which receiver 85 is detected to facilitate viewing of content from an identified entity. Variable $J_{n,1}$, exemplarily used herein, may be a set of intervals in which both receiver 85 and user device 90 are detected to facilitate viewing of content from an identified entity. Variable $J_{n,2}$, exemplarily used herein, may be another set of intervals in which receiver 85 is detected to have facilitated consecutive content viewing (e.g., for at least a whole interval) from an identified entity and in which user device 90 is detected to not have facilitated content viewing (e.g., from any entity). Variable $J_{n,3}$, exemplarily used herein, may be another set of intervals in which: (i) receiver 85 is detected to have facilitated content viewing from an identified entity, (ii) user device 90 is detected to not have facilitated content viewing from this entity, and (iii) either the viewing facilitated by receiver 85 is not consecutive or the content facilitated by user device 90 is viewed from another entity. As such, $J_{n,3}$ may be considered to encompass much if not all patterns of receiver 85's viewing other than $J_{n,1}$ and $J_{n,2}$.

Variable $J_{n,4}$, exemplarily used herein, may be a set of intervals in which receiver 85 is detected to have facilitated consecutive viewing of content from an identified entity. Variable $J_{n,5}$, exemplarily used herein, may be a set of intervals in which receiver 85 is detected to have facilitated consecutive viewing of content from an identified entity and in which user device 90 is detected to have facilitated content viewing.

Each of the foregoing variables may indicate one or more intervals in which content from an entity is viewed on day n (n being any suitable, natural number), to account for all of the different types, patterns, or configurations of viewing, the latter two variables $I_{n,4}$ and $I_{n,5}$ being used to determine upper bounds (as described below). In some embodiments, information component 30 may identify each entity, e.g., via an identifier (ID) or one or more other names.

Variable $t_i$, exemplarily used herein, may be a number of minutes any content from a given entity is facilitated for viewing by user device 90 in a given time interval. Variable $s_i$, exemplarily used herein, may be a number of minutes any content from a given entity is facilitated for viewing by receiver 85 in a given time interval.

In some embodiments, the viewing may be continuous (e.g., 7:12 PM to 7:28 PM) or intermittent (e.g., 7:03 PM to 7:07 PM; 7:22 PM to 7:25 PM; 8:00 PM to 9:30 PM). In either of these implementations, information component 30 may determine a total amount of viewing in each interval. For example, information component 30 may determine the total amount of viewing, by each device ID, on each network, in each interval, and for each TV market. Hashing component 32 may then perform a similarity hash on sets of tuples (each of which comprising the network, interval, and minutes viewed) for each device ID to find candidate pairs of device IDs. The candidate pairs may be associated with roughly similar viewership data. Hashing component 32 may adjust (e.g., decrease) the sensitivity of the match, and then this component may repeat the hashing, until a number of likely matches is low enough for a remainder to finish on given, circumscribed hardware on which one or more of the herein-described processor components are running, without exhausting memory or disk space.

In some embodiments, at least two sets of viewing data is respectively obtained from at least two sources. For example, information component 30 may obtain said data from a smart TV, which may implement automatic content recognition (ACR) on its viewing, and from an STB providing viewing. As mentioned, the viewing data obtained from each of user device 90 (e.g., the smart TV) and from receiver 85 (e.g., the STB) may include (i) an identifier of the network being watched (e.g., via public network 70 or via private network 80), (ii) times when the viewing started and ended, and/or (iii) one or more other parameters.

In some embodiments, information component 30 may round view times, which are used in subsequent hashing operations. For example, this component may round (e.g., either up or down) the network view time of a particular interval to the nearest 30 seconds. That is, if user device 90 and receiver 85 have view times within 30 seconds of each other from the same entity and within the same quarter hour, a resulting hash of these view times will have a same value. Hashing component 32 may thus not hash on, e.g., a fraction of a minute or a fractions of a second. In some embodiments, the determined total amounts of viewing may each be within 30 seconds of each other or within one or more other numbers of seconds of each other for matching component 34 to determine a match.

In some embodiments, hashing component 32 may implement a one-way, deterministic function or algorithm. For example, this component may be given a particular set of times and always produce the same output for that input, with this component always passing through a same or similar sequence of states. The one-way, deterministic function may use a cryptographic algorithm, such as a message digest (MD) algorithm.

In some embodiments, deterministic component 32 may perform a one-way, deterministic function, such as MinHash (or the min-wise independent permutation locality sensitive hashing scheme), for quickly estimating how similar two datasets are. For example, the Jaccard similarity coefficient (or output of Euclidean, Hamming, Manhattan, Minkowski, Tanimoto, Mahalanobis, and/or cosine distance) may be used to indicate similarity between two datasets. In some embodiments, hashing component 32 may perform a min-wise hash on the sets (each with subsets), of which a minimum set of values is obtained. MinHash may thus be a hash function on different sets (e.g., such that a collision probability is equal to a Jaccard index). By finding many such MinHash values and counting the number of collisions, some embodiments of hashing component 32 may efficiently (e.g., with optimum computational performance) estimate this index, without having to explicitly compute the similarities. In some embodiments, hashing component 32 may hash each item in the set and return the minimum hash value(s) (MinHash) of a dataset. As such, by comparing the minimum value(s) rather than all hash values, this approach is faster than exhaustive comparisons.

In some implementations, a number of values in a set may be substantially smaller than a number of views in the time-based views (thus improving computer technology due to a reduced computational burden in comparison to any known, exhaustive matching method). For example, a number of unique values of the sets of values outputted by hashing component 32 may be substantially smaller than a number of unique, time-based views in the corresponding subset of viewership data.

In some embodiments, more than one value is hashed. In these or other embodiments, a different hash function may be used each time. For example, different hash functions may produce hash values that are different from previous such executions. In another example, the hash function may be the same, but a governing input parameter may be adjusted each iteration (e.g., to make the hash function behave differently). As such, pairs of datasets may not be considered matched after a previous run, but a subsequent run may more properly estimate a match. Matching component 34 may then compare and attempt matching of the values hashed by any of those hash functions. In some embodiments, the hash results from a previous run may be stored, e.g., which may indicate higher, positive scores.

In some embodiments, different functions of a set of deterministic functions may be used on the same pair of datasets to arrive at different or higher matching probabilities. In these or other embodiments, hashing component 32 may utilize a sliding window such that portions of the same datasets are hashed more than once. For example, when a time period is six weeks, the whole six weeks of data may be hashed for subsequent comparison. Then, in a next week, the next six weeks (which includes 5 of the previous 6 weeks) may be hashed and so forth until all viewership data from pairs of devices are utilized.

In some embodiments, hashing component 32 may perform a deterministic function (e.g., MinHash) on the time-based entity views of the viewership data to roughly determine what a user was watching. After hashing component 32 performs the deterministic function on tuples from different datasets, matching component 34 may consider the sets to be matched, when the outcome indicates that the sets are similar enough. As such, processor(s) 20 may find likely matches in a substantially quicker way than by exhaustive datasets' matching, e.g., in scenarios numbering 10 million matching dataset tuples. This approach is beneficial because a scoring function to be subsequently performed may be too slow to score each possible pair, e.g., when there are too many pairs to actually complete in a reasonable amount of time.

In some embodiments, hashing component 32 may hash a network identifier and an amount of time content is viewed in a particular time interval for each day of a period of observation time, which could span several (e.g., 6) weeks. An output of the deterministic function may include several (e.g., 50) of the smallest hash values. For example, instead of needing to compare 2×4×24×n (there being 2 datasets, 4 quarter-hour intervals, and 24 hours in a data, n being a number of days in the time period) for each of those sets, matching component 34 may only need to compare the several (e.g., 50) or less hash values. When a number of matches (e.g., between a TV and an STB) satisfies a criterion or threshold, then they may be considered nearly matched. They do not have to match on quality, which makes the herein-disclosed approach faster than trying to use an actual function to compare over all the viewing. In other words, when comparing, the hash values have to be equal, but hashing component 32 may only generate a certain number of hash values from the viewership dataset of each device such that matching component 34 does not need to compare all tuples. In other words, by sorting (e.g., increasing or decreasing) the outcome of hashing component 32 before comparing, the process may be considerably sped up (e.g., to sum up for each pair how many values the two devices reported common viewership).

In some embodiments, matching component 34 may determine an initial match between two different sources of data (e.g., from one user device 90 and one receiver 85). This is significant, as each dataset from these sources may be noisy or otherwise erroneous.

In some embodiments, matching component 34 may determine matching sets of viewing data from user device 90 (or from electronic storage 22 or network 70) and receiver 85. As such, information component 30 may combine sources of viewing that contain redundant data. In these or other implementations, matching component 34 may match pairs of devices from different sources. Since the sources of viewing data may not be complete and may not be entirely consistent with each other, matching component 34 may perform fuzzy matching (e.g., due to the number of potential matches being high). Matching component 34 may thus avoid an exhaustive comparison between every pair of sets of viewing data. Known scoring functions are too computationally intensive and thus too slow to perform at a market level because some of the markets have a very large number of devices. One or more components of processor(s) 20 thus perform intermediate operations, to get likely matches before a more accurate scoring function is performed.

In some embodiments, matching component 34 may perform a Jaccard similarity between outputs of the MinHashes and may make a selection based on the similarity satisfying a criterion. For example, a Jaccard similarity score of 0.4, of 0.8, or between 0.4 and 0.8 may be relatively low but still high enough for a match to be indicated (e.g. for selection). As such, datasets of candidate pairs of devices do not have to have a lot in common for a match to be indicated by matching component 34.

The scores used in the following equations are each determined in relation to another device. For example, $STB_n$ may exemplarily denote the STB-to-TV score for day n, in implementations where receiver 85 is an STB. And $TV_n$ may exemplarily denote the TV-to-STB score for the same day n, in implementations where user device 90 is a smart TV. Exemplary equations for determining these scores are as follows:

$$TV_n = (\Sigma_{i \in In,1}(\min(t_i, s_i)) + \Sigma_{i \in In,2}(0) + \Sigma_{i \in In,3}(-1 \times t_i))/(\Sigma_{i \in In}(t_i)) \quad [1]$$

$$STB_n = (\Sigma_{i \in Jn,1}(\min(t_i, s_i)) + \Sigma_{i \in Jn,2}(0) + \Sigma_{i \in Jn,3}(-1 \times s_i))/(\Sigma_{i \in Jn}(s_i)) \quad [2]$$

One scoring function, which determines variable Scorer$_n$, may be an average score for viewing in day n of the viewing period:

$$Score_n = \frac{1}{2} \times (TV_n + STB_n) \quad [3]$$

Criteria for a successful match may be:

$$\Sigma_{n \in FirstHalf}(Score_n > 0) \quad [4]$$

$$\Sigma_{n \in SecondHalf}(Score_n > 0) \quad [5]$$

$$\Sigma_{n \in WholePeriod}(Score_n > 0) \quad [6]$$

As such, a sum of the scores for the days in a first half of the viewing period, a sum of the scores for the days in a second half of the viewing period, and a sum of the scores for every day in the viewing period may each be evaluated to determine whether it is greater than a threshold (e.g., zero). However, because the score may tend to give too much weight or credence to devices with little viewing, another scoring function may be used. This other scoring function may comprise performing a weighted average, as such:

$$((\Sigma_{n \in FirstHalf}((TV_n \times a_n) + (STB_n \times b_n)))/(\Sigma_{n \in FirstHalf}(a_n + b_n))) > 0 \quad [7]$$

$$((\Sigma_{n \in SecondHalf}((TV_n \times a_n) + (STB_n \times b_n)))/(\Sigma_{n \in SecondHalf}(a_n + b_n))) > 0 \quad [8]$$

$$((\Sigma_{n \in WholePeriod}((TV_n \times a_n) + (STB_n \lambda b_n)))/(\Sigma_{n \in WholePeriod}(a_n + b_n))) > 0 \quad [9]$$

As exemplarily used herein, the variables $a_n$ and $b_n$ may each indicate how much viewing was in each day, as follows:

$$a_n = \Sigma_{i \in In}(t_i) \quad [10]$$

$$b_n = \Sigma_{i \in Jn}(s_i) \quad [11]$$

When the number of minutes viewed is non-zero, the inequality of equation 7 may be equivalent to:

$$(\Sigma_{n \in FirstHalf}((TV_n \times a_n) + (STB_n \times b_n))) > 0 \quad [12]$$

while defining the following:

$$In = I_{n,1} \cup I_{n,2} \cup I_{n,3} \quad [13]$$

$$J_n = J_{n,1} \cup J_{n,2} \cup J_{n,3} \quad [14]$$

$$I_{n,4} = I_{n,2} \cup I_{n,5} \quad [15]$$

$$J_{n,4} = J_{n,2} \cup J_{n,5} \quad [16]$$

$$I_{n,1} = J_{n,1} \quad [17]$$

In some embodiments, matching component 34 may only compare a portion (i.e., significantly less than the full portion) of the smaller or smallest hash values (e.g., the 50 smallest values) resulting from a set of deterministic (e.g., MinHash) functions. But this is not necessarily intended to be limiting, as the larger or largest values may also be suitable (or even a particular range of values). Hashing component 32 may generate these hash values based on viewership datasets from two different devices, each facilitating content watching of the same network and in the same interval(s). The datasets may be different but at least one hash value resulting from each set, when compared, may be equal for indicating a preliminary match.

When there is a positive score, in each portion of a time period under evaluation, then matching component 34 may determine a match or near match. In exemplary implementations of near matches, either user device 90 may have a near match with more than one receiver 85, or receiver 85 may have a near match with more than one user device 90. For example, if TV A has a near match with STB X and STB Y, then information component 30 may discard data from the latter STB devices. Similarly, if STB A has a near match with TV X and TV Y, then information component 30 may discard data from the latter TV devices. And these operations to discard respective sets of viewership data may be performed because matching component 34 may be unable to determine a unique match. In some embodiments, matching component 34 may attempt to find a one-to-one match between a device of a first type (e.g., STB) and one other device of a second, different type (e.g., smart TV).

In some embodiments, matching component 34 may compare not only where two devices of a candidate pair facilitate the same viewing, but when one facilitates viewing and the other does not. The comparison may thus be over one or more portions of a time period (e.g., a six-week period), the viewing in which is performed in different patterns. For example, the herein described summations and other calculations may be performed for a first time portion (e.g., 1$^{st}$ half) and for one or more other time portions (e.g., 2$^{nd}$ half, whole, etc.).

In some embodiments, matching component 34 may generate a sketch or an estimate of the viewership dataset, the sketch or estimate being like a subset of the viewership dataset and thus not being necessarily complete. For example, matching component 34 may compare the set of values (e.g., 50 values) and determine a similarity between the two sets of each distinct pair of devices of a market. This similarity may indicate how much the two datasets actually share viewership data. A number of similar hash value pairs that match may need to satisfy a criterion before matching component 34 indicates a match. This match may be considered a likely or preliminary match.

In some embodiments, matching component 34 may determine a measure of how similar datasets are. For example, at least one interval comprises equal viewing, there having to be some common interval and some common network viewed. In this example, the time-based views indicate (e.g., suspected-active) viewership (i.e., with respect to different devices or even different types of devices), within a minute of each other. That is, some embodiments of matching component 34 may require the datasets to have at least one tuple indicating equality but the sets as a whole not indicating exact (e.g., not all tuples of both sets being required equal) viewing. Sensitivity in a number of the at least one tuple may be adjustable to any suitable value, e.g., for indicating a match or near match. This sensitivity may be based on hardware (e.g., RAM, processors, busses, etc.) that may support calculations being completed within a timeframe that satisfies a criterion. For example, this sensitivity may be higher than a competitor's that may not have that same computation ability or power.

In some embodiments, scoring component 36 may determine an easier-to-compute upper bound by reducing the left-hand-sign of equation 12 (and use it to eliminate pairs of devices with non-positive scores from consideration before testing the condition equation 7, i.e., of a first half time portion), as depicted in FIG. 4. FIG. 4 demonstrates that the preliminary score is always greater than or equal to (e.g., a positive multiple of) the similarity score. The last line of FIG. 4 may be further reduced to a resulting upper bound equation, as follows:

$$(\Sigma_{n \in FirstHalf}(\Sigma_{i \in J_n,1}(2 \times \min(t_i,s_i)+t_i+s_i)))-(\Sigma_{n \in FirstHalf}(\Sigma_{i \in J_n,1 \setminus J_n,4}(t_i)))-(\Sigma_{n \in FirstHalf}(\Sigma_{i \in J_n,1 \setminus J_n,4}(s_i)))$$ [18]

In some embodiments, deterministic component 32 may determine hashes to identify candidate pairs. In these embodiments, scoring component 36 may then generate a preliminary score for each candidate pair, which may involve taking an upper bound to narrow potential matches down to reduce the scoring function's processing burden. The upper bound of equation 18 may basically involve determining a sum on each device and then a sum on only the hours that are viewed that are the same.

In some embodiments, matching component 34 may resolve scenarios, where many (e.g., 100) people watched content from the same entity for a same amount of time (e.g., in one or more intervals), as otherwise gleaning matches from this scenario would create false positives.

As exemplified by equation 18, a preliminary score may be based on a first total of 2 multiplied by a minimum of the TV-viewing and STB-viewing, a product of which may then be added to the TV-viewing and the STB-viewing over all the viewing shared by this pair of devices minus a second total non-consecutive viewing on the TV and a third total non-consecutive viewing on the STB. The view times may be measured in minutes. And this equation 18 may be executed for each time period portion (e.g., three times, including a first half, a second half, and both halves) and for each pair of potentially matched device IDs; the above equation 18 exemplifies the first half time period portion. Similar upper bounds may thus be calculated for one or more of the other two conditions, which are for other time portions, by employing the same reduction and processing of FIG. 4 to one or more of equations 8 and 9. Executing either of these three equations may be faster to calculate than the final similarity score, and if a resulting value is zero or negative, then the final score must be zero or negative. This performance optimizing use of the preliminary score thus allows finding some pairs of devices that must have zero or negative scores, without actually determining a final (more accurate) score for them. That is, pairs of devices associated with an upper bound, which is below a threshold for any time period portion, are discarded.

For each remaining pair of devices, scoring component 36 may calculate the final similarity score for each different time period portion. And information component 30 may only retain (e.g., in electronic storage 22) those unique matches for which all three scores are above a given threshold. Then, information component 30 may deduplicate (e.g., remove all associated viewership data), when a device is matched to more than one other device. In some embodiments, reporting component 38 may output the pairs of device IDs (e.g., corresponding to the unique matches) and the scores assigned to them. For example, this component may output one device ID from either source of viewing data.

By subtracting some positive number so that a sum is positive and by discarding that, the number may be bigger, which forms the basis for the inequality of the 3$^{rd}$ line from the bottom of FIG. 4. For example, when scoring component 36 is no longer subtracting that positive amount, then the next sum is bigger. The reason it is introduced is just to make a positive constant that scoring component 36 may then ignore, this being the difference between the final scoring function and the preliminary scoring function. And an outcome of using the preliminary scoring function is that it allows scoring component 36 to change the final scoring function to a form that is quicker and less computationally burdensome to calculate.

Because $I_n \setminus I_{n,4}$ (e.g., the quarter hours and networks for which a TV has viewing, which was not consecutive) depends only on the TV viewing and $J_n \setminus J_{n,4}$ (e.g., the quarter hours and networks for which an STB has viewing, which was not consecutive) depends only on the STB viewing. For example, the second and third sums in equation 18 may be calculated once for each device, and the first sum may be a sum over only indices i that are shared by both devices.

As mentioned, hashing component 32 may adjust its sensitivity, e.g., after starting with an initial sensitivity that results in too many matches. By reducing (e.g., iteratively) the sensitivity, matching component 34 may require a greater level of similarity between datasets of two devices such that a number of matching hash values reduces to a level that may be timely processed with existing hardware components, for a particular market. But, in some implementations, even this reduced amount may still result in like ten million pairs so scoring that many different pairs may still be a little too slow on current hardware. Accordingly, scoring component 36 may determine whether an upper bound is positive in one or more different portions of a time period (e.g., the first half, second half, the entire period, etc.). And if the upper bound is not positive in any of the portions, then a final similarity score may not also be positive; these pairs are thus discarded. More often than not, the scores may be negative (e.g., where compared values have no relation and thus are random), when picking random devices. A result of the foregoing upper bound evaluations may result in pairs numbering, e.g., in the thousands for the market.

In some embodiments, scoring component 36, when determining the upper bound, may determine noisiness in the data. For example, when the smart TV watched the same thing for one or more of the most recent time intervals, reported data is noisy because the user most likely just left on their TV. That is, the candidate match is scored positively (e.g., because both devices report viewing at the same interval, for the same network, and same day), the candidate match is scored zero (e.g., as shown in the middle summation of equations 1-2), and the candidate match is scored negatively (e.g., as shown in the far-right summation of equations 1-2). As such, scoring component 36 may repeat calculations from opposite perspective (e.g., from the TV or from the STB).

Determining the preliminary score (e.g., via an equation similar to equation 18) may be faster to calculate than the final scoring functions (e.g., via an equation similar to equations 7-9) because calculating the second and third totals only requires summing the viewing for each TV or STB separately, these totals only needing to be calculated once for each device instead of once for each pair of devices. Also, calculating the first total may only require summing over the viewing for both devices, which match exactly on both interval and entity viewed, both reducing the amount of data to be totaled over and allowing a sorting of the data or a using of an index to make the calculation faster.

Determining the upper bound before a final scoring operation may significantly decrease execution time or otherwise optimize performance of subsequent scoring computations (e.g., performing at least the final scoring).

Some embodiments of scoring component 36 may perform a simple scoring function, as in equations 3-6 (above). In these or other embodiments, this component may perform one or more optimized scoring functions, which may include determining an upper bound. The upper bound may be calculated more efficiently than the simple scoring function, the upper bound being useable to eliminate pairs of devices with non-positive scores. For example, scoring component 36 may discard, for any of the three scores, viewership data of pairs of devices whose upper bound is below a threshold.

In some embodiments, positive scores indicate some level of similarity, since if the TV watched a network and the STB did not watch anything, then this suggests to matching component 34 that the STB is consecutively viewing; this particular interval may then be given a zero score. And, if the TV was watching a network and the STB was watching another network, then scoring component 36 may assign a negative score to the interval based on a number of minutes the TV was watching.

In some embodiments, scoring component 36 may determine a final score that is between one and negative one, one indicating a perfect match and negative one indicating perfect orthogonality between the datasets. For example, scoring component 36 may determine a weighted average, which may be considered a measure of association or similarity between viewership datasets from a pair of devices. As such, matching component 34, to determine a match, does not expect the datasets to be equal; rather, only individual tuples of hash values do have to be equal. In some embodiments, this similarity score may indicate how much a pair of devices are watching content from the same entity at the same time.

In some embodiments, scoring component 36 may generate a score for user device 90 (e.g., for each day) and then multiply that score by the number of view minutes (e.g., for that day). This component may then generate a score for receiver 85 (e.g., for the same day), which may be multiplied by the number of view minutes (e.g., for that day). These multiplication products are then added and summed, over an entire portion of a time period to result in the numerator of exemplary equations 7-9. The denominator involves another summation, the effect of which completes the intended weighted average. For a broadcast day, scoring component 36 may average (e.g., via a weighted average) the line-scores, e.g., by summing them up and dividing by total live time spent viewing. This average, which indicates a measure of association, may be in a range of −1 to 1.

In some embodiments, reporting component 38 may facilitate campaign effectiveness (e.g., campaign reach and frequency), device graph updates, and/or smart-TV/STB deduplication. In some embodiments, reporting component 38 may facilitate inference of relationships between user devices 90 and receivers 85. In some embodiments, the deduplication and/or relationship inference may be useful for using viewership data (e.g., from a smart TV) for a ratings service. For example, the deduplication may cause more accurate evaluations of viewership.

By deduplicating, reporting component 38 may facilitate not using both sources of a determined pair of device to avoid counting the same data (e.g., from a same household) twice. As such, in some embodiments, information component 30 may combine sets of viewership data such that all data of the STB and TV viewership sets are used except that all redundant data from one of these sets is discarded. One benefit of this approach is that since datasets of a pair may not be identical, new information for a common user may be identified that is not in the other dataset (and vice versa).

FIG. 2 exemplarily depicts a single day's viewership data of different networks/entities, line score sums, and an overall score from each of a smart TV and STB, the latter scores of which are averaged. In some embodiments, this average may instead be a weighted average based on how much viewing there was for each device. As such, resulting scores are prevented from giving too much weight or credence to the devices that did not have too much relevant information or any actual viewing. In FIG. 2, the term "day_qh" represents a quarter hour interval of a given day, the term "network_callsign" indicates a particular entity from which content viewing is facilitated by a given device, and the term "line-score" indicates an output of one term that is summed in the numerator of equation 1 or 2. The line-scores may be summed, for each device (e.g., for user device 90, as on the left side of FIG. 2, and for receiver 85, as on the right side of FIG. 2), and divided into a total view time to arrive at $TV_n$ and $STB_n$, as depicted in FIG. 2. The average of these quotients is depicted as 0.843, which may be considered to satisfy a criterion, since in some implementations a value closer to 1 may be considered to indicate a greater level of similarity.

In the example of FIG. 2, the 2.43 minutes of view-time pertain to a first subset of a set, the 1.32 minutes of view-time pertain to a second subset of the set, the 14.75 and 14.98 minutes of view-time pertain to a third subset of the set, and the 2.77, 14.25, and 14.98 minutes of view-time pertain to a fourth subset of the set, each of these subsets respectively relating to a different, identifiable network.

In some embodiments, information component 30 may prune viewership data to commonly-reported content (e.g., that is in both data sources). Next, scoring component 36 may, for each line-item of viewership data from a smart TV, create a line-score. This line-score may be: (i) the minimum of the STB-time and the TV-time, when a corresponding STB has viewership to a same network in a same time interval; (ii) zero, when the corresponding STB does not have viewership at all in the same interval but when the TV did watch the same network for at least one entire interval; and (iii) negative 1 multiplied by the TV-time, when the corresponding STB does not have viewership to the same network and the same interval. This process of determining the TV-to-STB line-scores may be similarly repeated to measure the STB-to-TV line-scores.

As depicted in FIG. 2, the TV/STB scores may be based on viewership data of a plurality of different networks. In some embodiments, information component 30 may determine an IP address of user device 90 to determine a geolocation. In some embodiments, information component 30 may determine a geolocation of receiver 85 based on a predetermined arrangement with a service provider (e.g., customer information). This information may be determined for identifying a market in which respective devices are located.

User devices 90 may pertain to a multitude of different people (e.g., thousands, hundreds of thousands, or even several millions of people). In some embodiments, the people may consume content with their devices 90 in different households. In these embodiments, some people may have multiple user devices 90 in a same household.

In some embodiments, a dataset from user device 90 may include an IP address (and/or another ID), but a dataset from receiver 85 may not include such information. Combining datasets of matched pairs therefore allows an association or link of viewership data from receiver 85 to the IP address.

In some embodiments, viewership data from user device 90 may be determined to be in a market based on a geolocation function of its IP address, and viewership data from receiver 85 may be determined to be in the same (or other) market based on service subscription data.

The operations of FIG. 3, described below, may each be repeated for another market, each of the devices being identified in a market based on their IP address or subscriber information. Several geographic markets each contain a plurality of households, each household comprising one or more of each of receiver 85 and user device 90. In some embodiments, a number of devices in the market may number in the hundreds of thousands, and a number of the datasets may number in the millions. In some embodiments, receiver 85's subscriber data may show demographic information of the associated users or of users in a sampled household (e.g., who may own user device 90). In some embodiments, the tune data may be combined with schedule data that relates to the playing schedule of the contents. In some embodiments, the schedule data may be received as a separate data feed, and may be combined with the tune data by means of network/location/date/time.

Figure 3:
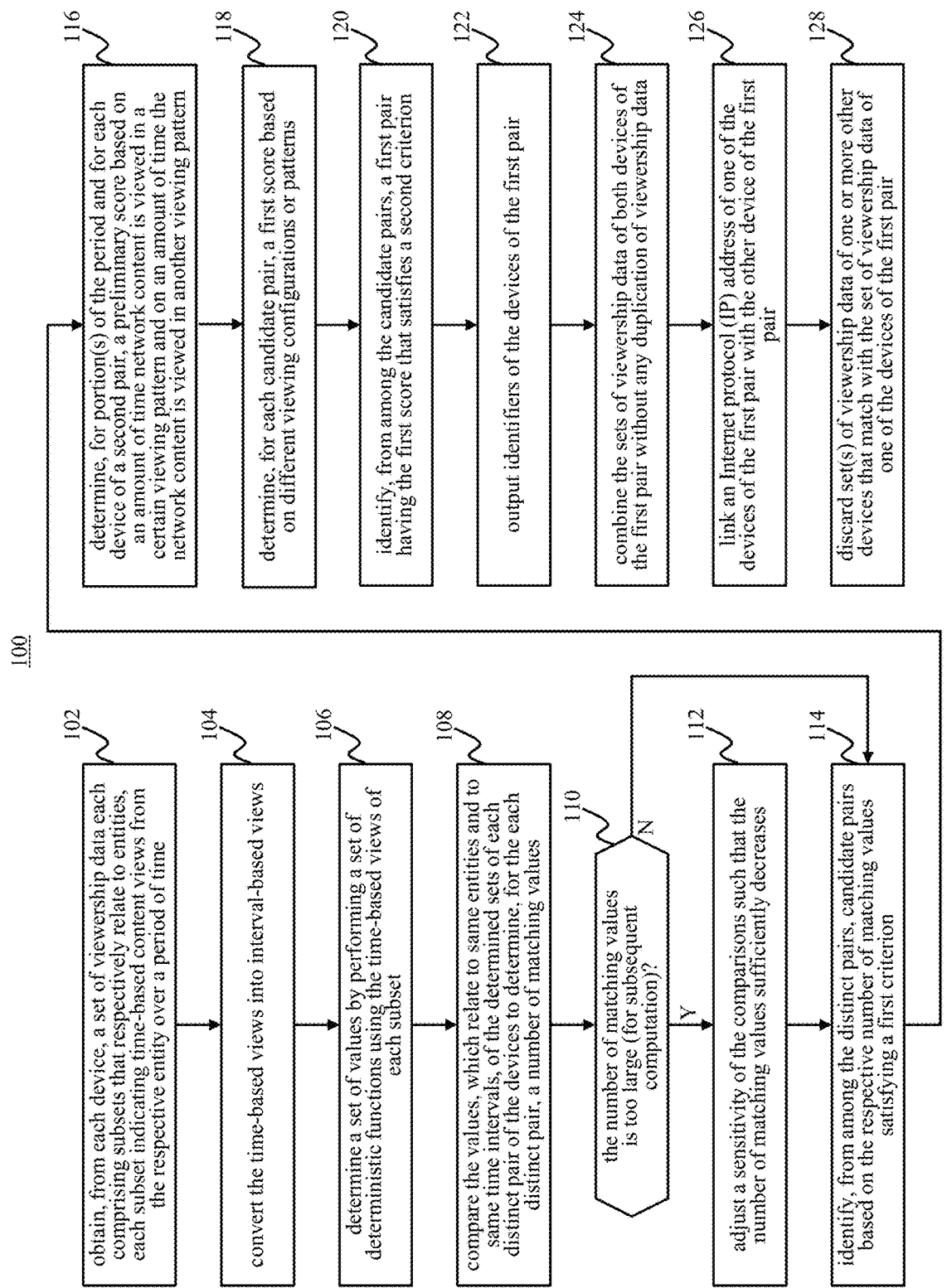
FIG. 3 illustrates a process for managing viewership data, in accordance with one or more embodiments.

FIG. 3 illustrates method 100 for deduplicating viewership data, in accordance with one or more embodiments. Method 100 may be performed with a computer system comprising one or more computer processors and/or other components. The processors are configured by machine readable instructions to execute computer program components. The operations of method 100 presented below are intended to be illustrative. In some embodiments, method 100 may be accomplished with one or more additional operations not described, and/or without one or more of the operations discussed. Additionally, the order in which the operations of method 100 are illustrated in FIG. 3 and described below is not intended to be limiting. In some embodiments, method 100 may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of method 100 in response to instructions stored electronically on an electronic storage medium. The processing devices may include one or more devices configured through hardware, firmware, and/or software to be specifically designed for execution of one or more of the operations of method 100.

At operation 102 of method 100, a set of viewership data may be obtained, from each device. Each set of the viewership data may comprise subsets that respectively relate to entities, each subset indicating time-based content views from the respective entity over a period of time (e.g., greater than 1 month). And each of the sets of viewership data may be noisy or otherwise incomplete. Relating to a respective entity implies that an amount of time content is measured to be viewed is from the entity in each of a set (e.g., 24 hours) of particular time intervals (e.g., quarter-hour). As an example, each of the entities may be a network, station, or channel. In this or another example, each of the devices may be one of a plurality of different types, a first of the device types exemplarily comprising an Internet-enabled display, and a second of the device types exemplarily comprising an information appliance that is coupled to and performs a service for the display. In some embodiments, operation 102 is performed by a processor component the same as or similar to information component 30 (shown in FIG. 1 and described herein).

At operation 104 of method 100, the time-based views may be converted into interval-based views. As an example, each of the time-based views may comprise start and stop times of viewing. And this conversion may be based on the start and stop times and may take place before any comparisons of calculated outputs of these interval-based views are performed. Before performing a set of deterministic functions, the each amount of view time may be rounded to a nearest minute or half-minute. An exemplary conversion of the time-based views of each of the subsets may result in an amount of view time in each interval of each day of the time period. In some embodiments, operation 104 is performed by a processor component the same as or similar to information component 30 (shown in FIG. 1 and described herein).

At operation 106 of method 100, a set of values may be determined, by performing the set of deterministic functions using the time-based views of each subset. As an example, the set of deterministic functions may implement min-wise independent permutation locality sensitive hashing (e.g., MinHash). In some embodiments, operation 106 is performed by a processor component the same as or similar to hashing component 32 (shown in FIG. 1 and described herein).

At operation 108 of method 100, the values, which relate to same entities and to same time intervals, of the determined sets of each distinct pair of the devices may be compared. This comparison may be used to determine, for the each distinct pair, a number of matching values. In some embodiments, operation 108 is performed by a processor component the same as or similar to matching component 34 (shown in FIG. 1 and described herein).

At operation 110 of method 100, a determination may be made as to whether the number of matching values is too large (e.g., for a subsequent computation). In some embodiments, operation 110 is performed by a processor component the same as or similar to matching component 34 (shown in FIG. 1 and described herein).

At operation 112 of method 100, a sensitivity of the comparisons may be adjusted such that the number of matching values decreases. As an example, matching component 34 (shown in FIG. 1 and described herein) may adjust a sensitivity of the comparisons such that the number of matching pairs of values is sufficiently decreased (e.g., down to 10 million or below, or relative to another suitable number).

At operation 114 of method 100, candidate pairs, from among the distinct pairs, may be identified based on the respective number of matching values. As an example, this number of matching values between a given pair may satisfy a first criterion or may otherwise breach a threshold for identifying candidate pairs. In some embodiments, operation 114 is performed by a processor component the same as or similar to matching component 34 (shown in FIG. 1 and described herein).

At operation 116 of method 100, a preliminary score may be determined, for portion(s) of the period and for each second pair of devices, based on an amount of time content of a network is viewed by each device of the second pair in a certain viewing pattern (e.g., one of the viewing patterns used to determine the first score) and on an amount of time content of the network is viewed by the each device in another viewing pattern. As an example, this other viewing pattern may be different from the viewing patterns used to determine the first score, as represented in equation 18 (which is exemplarily provided above). In this or another example, the respective number of matching values of the each second pair may satisfy the first criterion. And the identification of the candidate pairs may be further based on each of the one or more preliminary scores satisfying one or more second criteria. In some embodiments, the determination of each of the preliminary scores may be performed in substantially less amount of time than is needed to determine the first score for the each candidate pair. As an example, the preliminary score, which may be used to rapidly indicate an initial similarity, may represent an upper bound. In some embodiments, operation 116 is performed by a processor component the same as or similar to scoring component 36 (shown in FIG. 1 and described herein).

At operation 118 of method 100, a first score may be determined, for each candidate pair, based on different viewing configurations or patterns. As an example, the first score may be determined using an equation similar to equations 7-9 (which are exemplarily provided above). In some embodiments, the viewing configurations may each comprise: (i) both devices of the each candidate pair viewing content associated with the same entity; (ii) one device of the each candidate pair viewing content in consecutive time intervals and the other device of the same candidate pair not viewing any content; or (iii) the one device nonconsecutively viewing content while the other device is not viewing content from the same entity or the other device viewing content from a different entity from which the one device is viewing. These three viewing patterns are respectively described above as $I_{n,1}$ (or $J_{n,1}$), $I_{n,2}$ (or $J_{n,2}$), and $I_{n,3}$ (or $J_{n,3}$). In some embodiments, operation 118 is performed by a processor component the same as or similar to scoring component 36 (shown in FIG. 1 and described herein).

At operation 120 of method 100, a first pair, from among the candidate pairs, may be identified based on the first pair having the first score that satisfies the one or more second criteria. As an example, the score may be required to be positive, normalized, and more indicative of a match between datasets when the score is closer to one, for identifying the first pair. In this or another example, each of the first scores may comprise a plurality of second scores. And each of the second scores (i) may be determined for a different portion of the time period and (ii) may satisfy the one or more second criteria. Further, each of the second scores may be an average that is weighted by a total amount of viewing, in the respective portion of the period; this viewing may be facilitated by each device of the respective candidate pair. In some embodiments, operation 120 is performed by a processor component the same as or similar to reporting component 38 (shown in FIG. 1 and described herein).

At operation 122 of method 100, identifiers of the devices of the first pair may be output. In some embodiments, operation 122 is performed by a processor component the same as or similar to reporting component 38 (shown in FIG. 1 and described herein).

At operation 124 of method 100, the sets of viewership data of both devices of the first pair may be combined, without any duplication of viewership data. In some embodiments, operation 124 is performed by a processor component the same as or similar to information component 30 (shown in FIG. 1 and described herein).

At operation 126 of method 100, an Internet protocol (IP) address of one of the devices of the first pair may be linked, with the other device of the first pair. In some embodiments, operation 126 is performed by a processor component the same as or similar to information component 30 (shown in FIG. 1 and described herein).

At operation 128 of method 100, set(s) of viewership data of one or more other devices, which match with the set of viewership data of one of the devices of the first pair, may be discarded. One or more of the foregoing operations may be repeated for each different market. And each of the devices may be identified as being in a market based on an IP address or subscriber information of the each device. In some embodiments, operation 128 is performed by a processor component the same as or similar to information component 30 (shown in FIG. 1 and described herein).

Techniques described herein may be implemented in digital electronic circuitry, or in computer hardware, firmware, software, or in combinations of them. The techniques may be implemented as a computer program product, i.e., a computer program tangibly embodied in an information carrier, e.g., in a machine-readable storage device, in machine-readable storage medium, in a computer-readable storage device or, in computer-readable storage medium for execution by, or to control the operation of, data processing apparatus, e.g., a programmable processor, a computer, or multiple computers. A computer program may be written in any form of programming language, including compiled or interpreted languages, and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network.

Method steps of the techniques may be performed by one or more programmable processors executing a computer program to perform functions of the techniques by operating on input data and generating output. Method steps may also be performed by, and apparatus of the techniques may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random-access memory or both. The essential elements of a computer are a processor for executing instructions and one or more memory devices for storing instructions and data. Generally, a computer may also include, or be operatively coupled to receive data from or transfer data to, or both, one or more mass storage devices for storing data, such as, magnetic, magneto-optical disks, or optical disks. Information carriers suitable for embodying computer program instructions and data include all forms of non-volatile memory, including by way of example semiconductor memory devices, such as, EPROM, EEPROM, and flash memory devices; magnetic disks, such as, internal hard disks or removable disks; magneto-optical disks; and CD-ROM and DVD-ROM disks. The processor and the memory may be supplemented by, or incorporated in special purpose logic circuitry.

Several embodiments of the invention are specifically illustrated and/or described herein. However, it will be appreciated that modifications and variations are contemplated and within the purview of the appended claims.

What is claimed is:

1. A method for deduplicating viewership data, the method comprising:
   obtaining, from a plurality of different devices, sets of viewership data, wherein each of the sets of viewership data indicates a plurality of time-based views of content over a period of time;
   converting the time-based views of the content over the period of time into interval-based view times of the content for predetermined time intervals over the period of time;
   determining a set of values that relate to the same time intervals by performing a set of deterministic functions using the interval-based view times of each of the sets;
   comparing the values of the determined sets of values of each distinct pair of the devices;
   determining, based on the comparison, a number of matching values for each distinct device pair of devices;
   identifying, from among the distinct device pairs, a first number of candidate device pairs satisfying a first threshold number of matching values;
   determining that the first number of candidate device pairs does not satisfy a first criterion relating to at least one of a processing capability, a memory capability, or a bandwidth capability;
   decreasing, in response to the determination that the first number of candidate device pairs does not satisfy the first criterion, the first threshold number of matching values to a second threshold number of matching values;
   identifying, from among the distinct device pairs, a second number of candidate device pairs satisfying the second threshold number of matching values, wherein the second number of candidate device pairs is less than the first number of candidate device pairs;
   determining, for each of the second number of candidate device pairs, a first score based on a plurality of different viewing configurations;
   identifying, from among the second number of candidate device pairs, a third number of candidate device pairs having the first score that satisfies a second criterion; and
   outputting identifiers of the devices in the third number of candidate device pairs.

2. The method of claim 1, further comprising:
   determining, for each of the second number of candidate device pairs, and for one or more portions of the period of time, a preliminary score based on (i) an amount of time content is viewed by each device in one of the viewing configurations and (ii) an amount of time content is viewed by each device in another viewing configuration different from the one viewing configuration.

3. The method of claim 2, wherein the determination of each of the preliminary scores is performed in a substantially less amount of time than is needed to determine the first score for each of the second number of candidate device pairs.

4. The method of claim 2, wherein each of the preliminary scores comprises an upper bound similarity.

5. The method of claim 1, wherein each of the first scores comprises a plurality of second scores, and
   wherein each of the second scores (i) is determined for a different portion of the period and (ii) satisfies the second criterion.

6. The method of claim 5, wherein each of the second scores is weighted by a total amount of viewing, by each device of the second number of candidate device pairs, in the respective portion of the period.

7. The method of claim 1, further comprising:
   combining the sets of viewership data of both devices of each device pair without any duplication of viewership data,
   wherein each of the sets of viewership data is noisy or incomplete.

8. The method of claim 1, further comprising:
   linking an Internet protocol (IP) address of one of the devices of each device pair with the other device of each device pair.

9. The method of claim 1, wherein the viewing configurations comprise at least one of: (i) both devices of each candidate device pair viewing content of the same entity; (ii) one device of each candidate device pair viewing content in consecutive time intervals and the other device of the same candidate device pair not viewing any content; or (iii) the one device nonconsecutively viewing content of a different entity from which the other device is viewing.

10. The method of claim 1, wherein each of the time-based views comprises start and stop times of viewing.

11. The method of claim 10, wherein the predetermined time interval is one day, and the method further comprising:
    before performing the set of deterministic functions, rounding each interval-based view time to a nearest minute or half-minute.

12. The method of claim 1, further comprising:
    identifying each of the devices based on at least one of an IP address, identifier (ID), or subscriber information of each device.

13. The method of claim 1, wherein each of the devices is of one of a plurality of different device types,
    wherein a first of the device types comprises an Internet-enabled display, and
    wherein a second of the device types comprises an information appliance that is coupled to and performs a service for the display.

14. The method of claim 1, wherein the set of deterministic functions implements min-wise independent permutation locality sensitive hashing (MinHash).

15. The method of claim 1, further comprising:
    discarding at least one set of viewership data of one or more devices that match with the set of viewership data of one of the devices of the second number of candidate device pairs.

16. A system, comprising:
    a non-transitory recording medium including instructions for deduplicating viewership data; and
    a processor operably coupled to the non-transitory recording medium for executing the instructions of:
       obtaining, from a plurality of different devices, sets of viewership data, wherein each of the sets of viewership data indicates a plurality of time-based views of content over a period of time;
       converting the time-based views of the content over the period of time into interval-based view times of the content for predetermined time intervals over the period of time;
       determining a set of values that relate to the same time intervals by performing a set of deterministic functions using the interval-based view times of each of the sets;
       comparing the values of the determined sets of values of each distinct pair of the devices;

determining, based on the comparison, a number of matching values for each distinct device pair of devices;

identifying, from among the distinct device pairs, a first number of candidate device pairs satisfying a first threshold number of matching values;

determining that the first number of candidate device pairs does not satisfy a first criterion relating to at least one of a processing capability, a memory capability, or a bandwidth capability;

decreasing, in response to the determination that the first number of candidate device pairs does not satisfy the first criterion, the first threshold number of matching values to a second threshold number of matching values;

identifying, from among the distinct device pairs, a second number of candidate device pairs satisfying the second threshold number of matching values, wherein the second number of candidate device pairs is less than the first number of candidate device pairs;

determining, for each of the second number of candidate device pairs, a first score based on a plurality of different viewing configurations;

identifying, from among the second number of candidate device pairs, a third number of candidate device pairs having the first score that satisfies a second criterion; and outputting identifiers of the devices in the third number of candidate device pairs.

17. A non-transitory computer-readable medium comprising instructions executable by at least one processor to perform a method, the method comprising:

obtaining, from a plurality of different devices, sets of viewership data, wherein each of the sets of viewership data indicates a plurality of time-based views of content over a period of time;

converting the time-based views of the content over the period of time into interval-based view times of the content for predetermined time intervals over the period of time;

determining a set of values that relate to the same time intervals by performing a set of deterministic functions using the interval-based view times of each of the sets;

comparing the values of the determined sets of values of each distinct pair of the devices;

determining, based on the comparison, a number of matching values for each distinct device pair of devices;

identifying, from among the distinct device pairs, a first number of candidate device pairs satisfying a first threshold number of matching values;

determining that the first number of candidate device pairs does not satisfy a first criterion relating to at least one of a processing capability, a memory capability, or a bandwidth capability;

decreasing, in response to the determination that the first number of candidate device pairs does not satisfy the first criterion, the first threshold number of matching values to a second threshold number of matching values;

identifying, from among the distinct device pairs, a second number of candidate device pairs satisfying the second threshold number of matching values, wherein the second number of candidate device pairs is less than the first number of candidate device pairs;

determining, for each of the second number of candidate device pairs, a first score based on a plurality of different viewing configurations;

identifying, from among the second number of candidate device pairs, a third number of candidate device pairs having the first score that satisfies a second criterion; and outputting identifiers of the devices in the third number of candidate device pairs.

* * * * *